United States Patent
Saur

(10) Patent No.: US 9,943,939 B2
(45) Date of Patent: Apr. 17, 2018

(54) HAND-HELD MACHINE TOOL HAVING A SPINDLE-LOCKING DEVICE

(75) Inventor: Dietmar Saur, Gomaringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 748 days.

(21) Appl. No.: 13/883,823

(22) PCT Filed: Oct. 12, 2011

(86) PCT No.: PCT/EP2011/067797
§ 371 (c)(1),
(2), (4) Date: Jul. 19, 2013

(87) PCT Pub. No.: WO2012/062521
PCT Pub. Date: May 18, 2012

(65) Prior Publication Data
US 2013/0284478 A1    Oct. 31, 2013

(30) Foreign Application Priority Data
Nov. 11, 2010 (DE) .................. 10 2010 043 746

(51) Int. Cl.
*B23Q 5/20* (2006.01)
*B25F 5/00* (2006.01)

(52) U.S. Cl.
CPC .............. *B23Q 5/20* (2013.01); *B25F 5/00* (2013.01); *B25F 5/001* (2013.01)

(58) Field of Classification Search
CPC ................................. B23Q 5/20; B25F 5/00
USPC .................................................. 173/216, 217
See application file for complete search history.

(56) References Cited

U.S. PATENT DOCUMENTS

| | | | |
|---|---|---|---|
| 5,947,254 A | 9/1999 | Jones | |
| 2007/0267207 A1* | 11/2007 | Ito | B25B 21/02 173/217 |
| 2010/0252292 A1* | 10/2010 | Pyles | B23Q 5/20 173/164 |

FOREIGN PATENT DOCUMENTS

| | | |
|---|---|---|
| CN | 2384748 | 6/2000 |
| CN | 200998854 | 1/2008 |
| DE | 32 34 254 | 4/1983 |
| DE | 101 48 872 | 4/2003 |
| EP | 2 627 483 | 8/2013 |
| GB | 2 420 166 | 5/2006 |
| WO | WO 2010/079002 | 7/2010 |
| WO | WO 2012/049024 | 4/2012 |

OTHER PUBLICATIONS

International Search Report for PCT/EP2011/067797, dated Mar. 20, 2012.

* cited by examiner

*Primary Examiner* — Andrew M Tecco
*Assistant Examiner* — Praachi M Pathak
(74) *Attorney, Agent, or Firm* — Norton Rose Fulbright US LLP; Gerard Messina

(57) ABSTRACT

In a handheld machine tool having a tool housing in which a gear unit is situated to transmit a torque generated by a drive motor to a drive spindle, to which drive spindle a spindle-locking device is assigned, the drive spindle has at least one radial depression in which at least one spindle cylinder assigned to the spindle-locking device is accommodated.

9 Claims, 5 Drawing Sheets

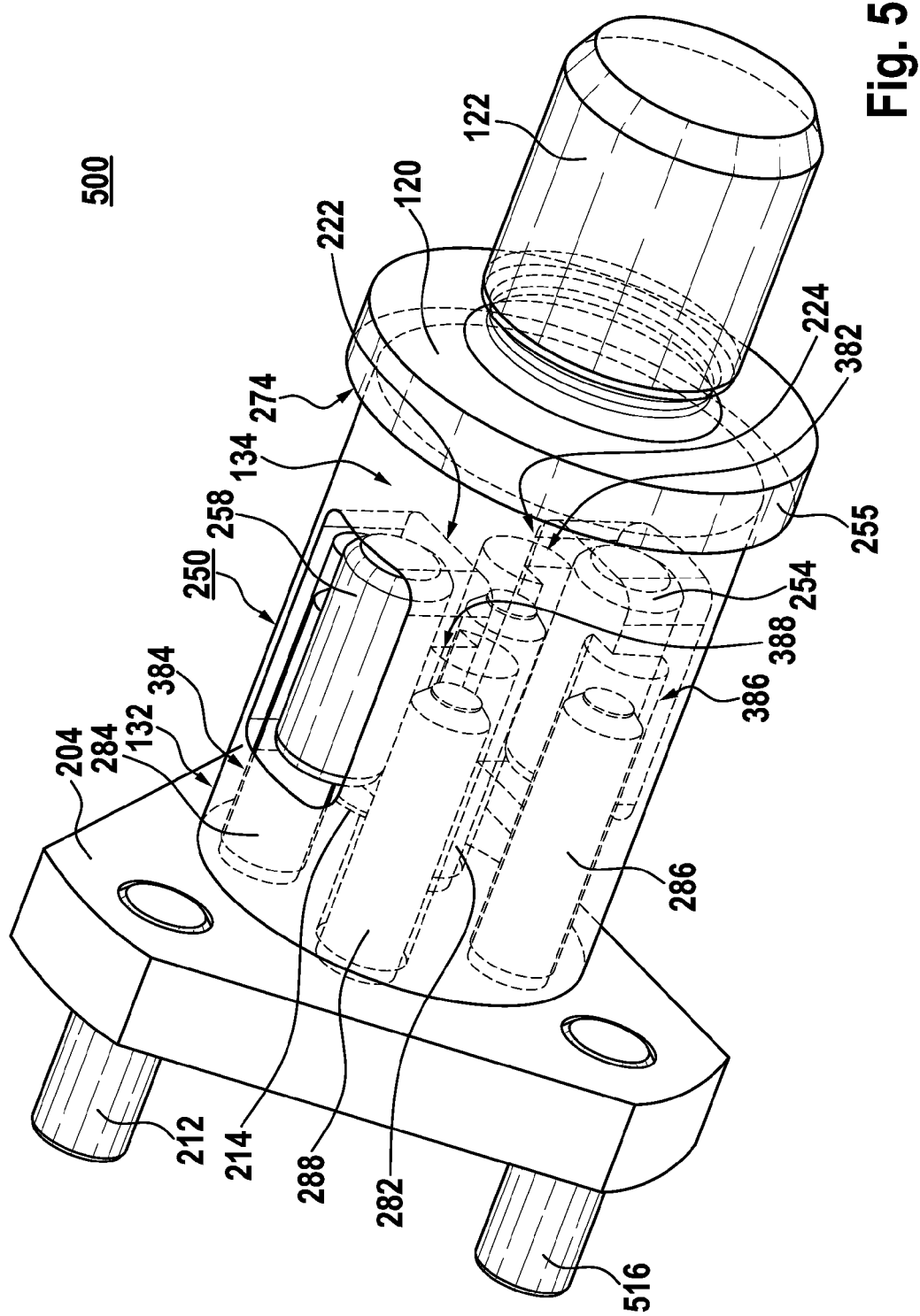

HAND-HELD MACHINE TOOL HAVING A SPINDLE-LOCKING DEVICE

BACKGROUND OF THE INVENTION

1. Field of the Invention

The present invention relates to a handheld machine tool having a tool housing, in which a gear unit is situated in order to transmit a torque, generated by a drive motor, to a drive spindle, to which a spindle-locking device is assigned.

2. Description of the Related Art

Handheld machine tools in which a drive spindle provided with a spindle-locking device is supported on two bearings inside a tool housing are known from the related art. The spindle-locking device is situated either in a region downstream from the two bearings in the axial direction of the drive spindle, or in one plane with a first bearing of the two bearings situated on or in the gear unit.

The disadvantage of the related art is that handheld machine tools in which the spindle-locking device is situated in a region downstream from the two bearings in the axial direction of the drive spindle, have a relatively long length in the axial direction of the drive spindle. In handheld machine tools in which the spindle-locking device is situated in one plane with a first bearing situated on or in the gear unit, the drive spindle has relatively large tipping play, on the other hand.

BRIEF SUMMARY OF THE INVENTION

One objective of the present invention therefore is to provide a new handheld machine tool having a spindle-locking device, which makes it possible to shorten the length of the handheld machine tool while simultaneously reducing the tilting play of its drive spindle.

This problem is solved by a handheld machine tool having a tool housing, in which a gear unit for transmitting a torque, generated by a drive motor, to a drive spindle is situated, which has been assigned a spindle-locking device. The drive spindle has at least one radial depression in which at least one spindle cylinder assigned to the spindle locking device is accommodated.

The present invention therefore makes it possible to provide a handheld machine tool in which a shortened drive spindle having a continuous bearing diameter is able to be used, since the spindle cylinder is situated in a radial depression of the drive spindle in order to thereby reduce the length and the tipping play of the drive spindle.

According to one specific embodiment, the drive spindle is rotationally mounted inside the tool housing at at least two bearings. The at least one radial depression is preferably situated directly between the two bearings in the axial direction of the drive spindle.

This makes it possible to realize a shorter length of the handheld machine tool in the axial direction of the drive spindle in an uncomplicated manner.

The at least two bearings in the tool housing are preferably provided in a region downstream from the gear unit.

It is therefore possible to provide a spindle-locking device which is separate from the gear unit.

According to one specific embodiment, at least two driver elements are situated in the drive spindle in order to transmit the torque generated by the drive motor to the drive spindle.

As a result, the present invention provides for a safe and reliable transmission of the torque, generated by the drive motor, to the drive spindle.

Preferably at least two driver elements engage at least partially in at least one radial depression.

This allows simple linking of the driver elements to the spindle-locking device.

It is furthermore preferred if the drive spindle has at least two axial openings through which the at least two driver elements engage with the at least one radial depression.

As a result, a robust and reliable operative connection is able to be established between the driver elements and the drive spindle for driving the drive spindle.

According to one specific embodiment, the at least one spindle cylinder in the at least one radial depression is situated at least partially between the at least two driver elements in the axial direction of the at least two driver elements.

The present invention therefore makes it possible to provide an uncomplicated and cost-effective spindle-locking device.

According to one specific embodiment, the at least two driver elements are developed to carry along the at least one spindle cylinder in a rotary motion when the torque generated by the drive motor is transmitted to the drive spindle, and to block the drive spindle when a torque is transmitted from the drive spindle to the at least one spindle cylinder.

Thus, a handheld machine tool which has a stable and reliable spindle-locking device is able to be provided by the present invention.

It is preferred if the at least one spindle cylinder is supported radially inside a blocking element; the blocking element is designed to prevent the at least one spindle cylinder from slipping out of the at least one radial depression in the radial direction of the drive spindle.

In this way the spindle cylinder is able to be fixed in place in the radial depression in a safe and stable manner.

The blocking element preferably has a circular form and is joined to the tool housing in torsionally fixed manner.

The blocking element may therefore be fixed in place inside the tool housing in an uncomplicated manner.

BRIEF DESCRIPTION OF THE DRAWINGS

FIG. 5 shows a perspective view of the drive spindle, the driver element, a roller bearing, the drive elements, the spindle cylinders, and the blocking element of FIG. 2.

DETAILED DESCRIPTION OF THE INVENTION

Figure 1:
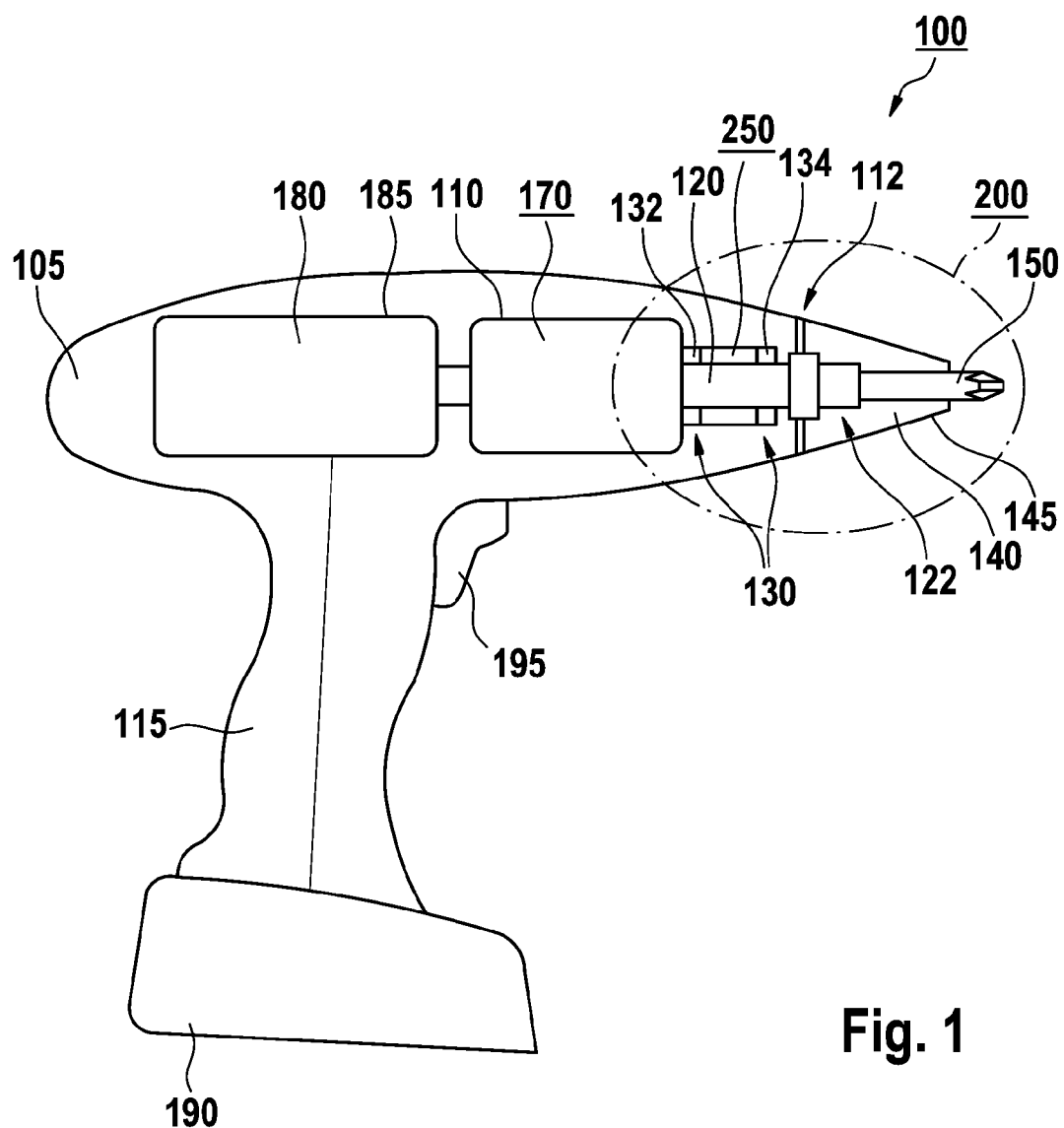
FIG. 1 shows a schematic representation of a handheld machine tool according to the present invention.

FIG. 1 shows a handheld machine tool 100, developed as handheld electric tool by way of example, which is provided with a tool housing 105 including a handle 115. According to one specific embodiment, handheld machine tool 100 is able to be connected, mechanically and electrically, to a rechargeable battery pack 190 for a power supply that is network-independent. In FIG. 1, handheld machine tool 100 is developed as a cordless screwdriver by way of example. However, it is pointed out that the present invention is not limited to cordless screwdrivers, but may instead be used in a variety of handheld machine tools in which a tool is made to rotate, independently of whether the handheld machine tool is operable by a battery pack network-independently or relies on a supply network, such as in the case of a battery-operated screwdriver, an impact screwdriver etc.

An electric drive motor 180 supplied with power by battery pack 190, and a gear unit 170 are situated inside tool housing 105. Via gear unit 170, drive motor 180 is connected to a drive shaft 120, such as a drive spindle, the drive motor being situated in a motor housing 185 by way of example. Gear unit 170 is located inside a gear housing 110 and developed to transmit a torque, generated by drive motor 180, to drive spindle 120. Gear housing 110 and motor housing 185 are situated inside tool housing 105, for instance.

For example, drive motor 180, which may be any desired motor type, such as an electronically commutated motor or a DC motor, is able to be operated, that is, switched on and off, via a manual switch 195. Preferably, drive motor 180 is controllable or regulatable electronically in such a way that both a reversing operation and specifications relating to a desired rotational speed are able to be realized. The method of functioning and the design of a suitable drive motor are sufficiently known from the related art so that a detailed description may be omitted here for the purpose of conciseness in the description.

Via a bearing system 130, drive spindle 120 is rotationally mounted inside housing 105 and provided with a tool holder 140, which is located in the region of an end face 112 of housing 105 and includes a drill chuck 145 by way of example. Tool holder 140 accommodates a tool 150, and may be integrally formed on drive spindle 120; as an alternative, it may be joined to drive spindle 120 in the form of an attachment. In FIG. 1, for example, tool holder 140 is developed as an attachment and fastened thereon via a mounting device 122 provided on drive spindle 120.

According to one specific embodiment, bearing system 130 has at least two bearings 132, 134, which are provided inside tool housing 105 in a region 299 downstream from gear unit 170. Associated bearing elements (e.g., 232, 234 in FIG. 2), which are used as spindle bearings and in which drive spindle 120 is supported in rotatable manner, are situated at bearings 132, 134.

According to one specific embodiment, a spindle-locking device 250 is assigned to drive spindle 120. The spindle-locking device is situated between the two bearings 132, 134 in the axial direction of drive spindle 120, preferably directly, and is used for centering drive spindle 120 when drive motor 180 is switched off, as described below for FIG. 3.

Figure 2:
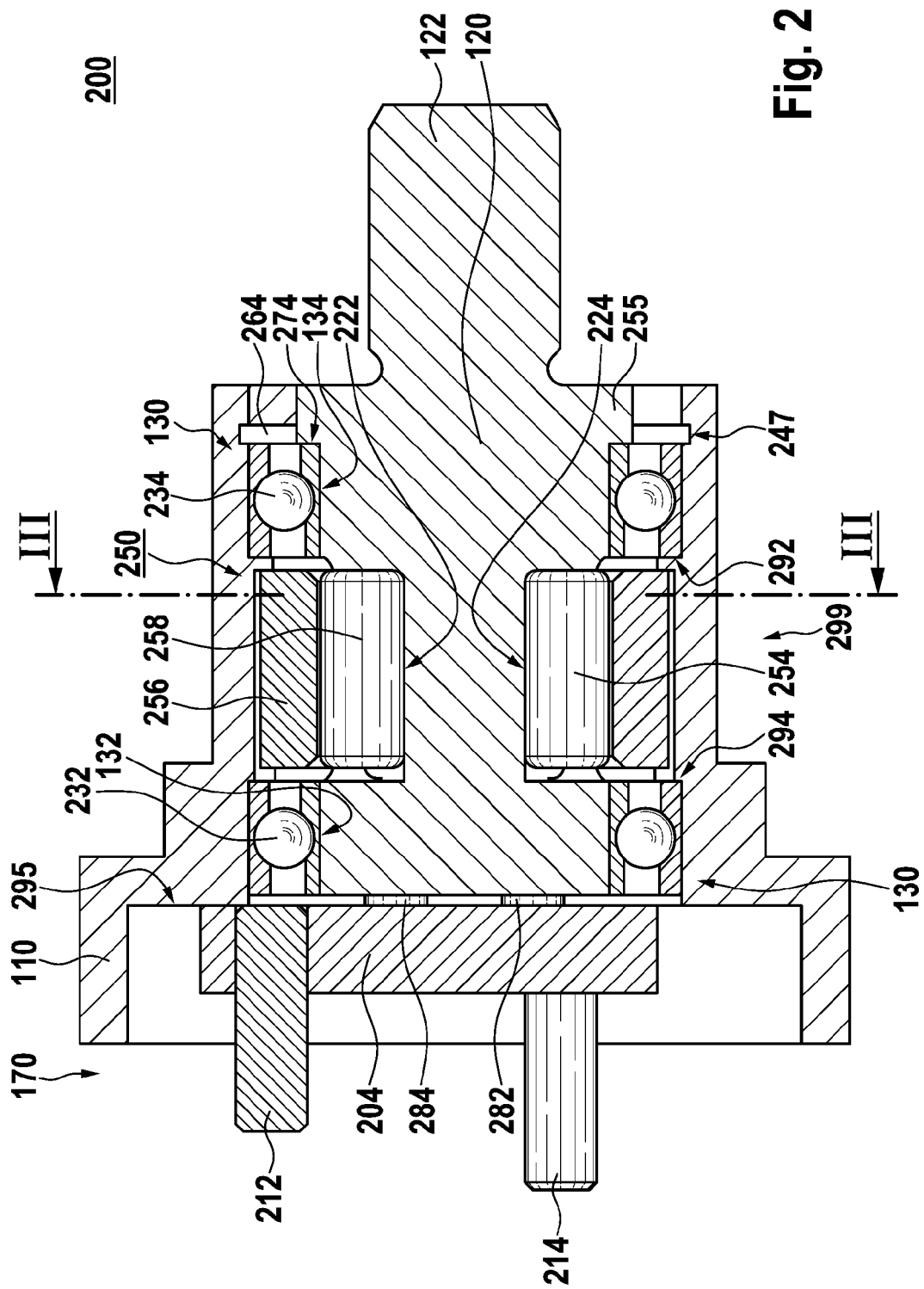
FIG. 2 shows an enlarged sectional view of a cutaway from the handheld machine tool of FIG. 1, which is provided with the spindle-locking device according to one specific embodiment.

FIG. 2 shows cutaway 200 of handheld electric tool 100 of FIG. 1, for which an illustration of tool 150 and tool holder 140 as well as tool housing 105 of FIG. 1 has been dispensed with for the sake of clarity and simplicity of the drawing. Cutaway 200 illustrates an exemplary embodiment of drive spindle 120, bearing system 130, as well as spindle-locking device 250, which is at least partially situated inside gear housing 110 of gear unit 170. By way of example, a first circumferential ridge 295, a second circumferential ridge 294, an annular flange 292 and an annular groove 247 are developed in the interior of gear housing 110, as will be described in the following text.

However, it is pointed out that the function of gear housing 110 may also be assumed by tool housing 105 of FIG. 1. In other words, both drive spindle 120 and bearing system 130 as well as spindle-locking device 250 may at least partially be disposed directly inside tool housing 105 of FIG. 1.

According to one specific embodiment, gear unit 170 is a planetary gear unit featuring different gear or planetary stages, which is rotatably driven by drive motor 180 of FIG. 1 when handheld machine tool 100 of FIG. 1 is in operation. Gear unit 170, for example, has a disk-shaped driver element 204, which transmits the torque of drive motor 180 of FIG. 1 to drive spindle 120 via associated, stud-type driver elements 282, 284 (and 286, 288 in FIG. 3), as described below in connection with FIG. 3, in order to rotatably drive drive spindle 120. Driving disk 204 is connected to a corresponding drive element of gear unit 170, e.g., an associated planetary-gear carrier, for instance via associated hold and drive studs 212, 214 (and 516 in FIG. 5). As an alternative, driving disk 204 may be formed by the associated planetary-gear carrier, so that hold and drive studs 212, 214 (and 516 in FIG. 5), for example, are used as bearings for associated planet wheels. Driver elements 282, 284 (286, 288 in FIG. 3) may be fastened on driving disk 204 in a variety of ways, such as by welding, or they may be integrally formed thereon or developed in one piece therewith.

Since the structure of a planetary gear unit is sufficiently known to one skilled in the art, a detailed description and illustration of a planetary gear unit is dispensed with for the sake of a concise description. However, it is pointed out that the description of the use of a planetary gear unit is of merely exemplary character and should not be seen as restriction of the present invention. Instead, it may be used in various types of gear units that are able to transmit the torque of drive motor 180 of FIG. 1 to drive spindle 120 in order to make it rotate.

According to one specific embodiment, drive spindle 120 has a uniform bearing diameter and, for example, is rotationally mounted inside gear housing 110, and thus inside tool housing 105 of FIG. 1, at the two bearings 132, 134 via two associated bearing elements 232 and 234, so that work spindle 120 has improved rotation characteristics. When viewed in the direction of tool holder 140 of FIG. 1, first bearing 132 is preferably situated directly downstream from driving disk 20,4 and thus from gear unit 170. When viewed in the direction of tool holder 140 of FIG. 1, second bearing 134 is situated at a distance from driving disk 204, and thus from gear unit 170.

Bearing elements 232, 234, for example, are developed as roller bearings, such as ball bearings. However, other types of bearings, e.g., sliding bearings, are usable as well. First ball bearing 232, for example, is disposed at first bearing 132, between driving disk 204 and first circumferential ridge 294 inside gear housing 110, e.g., by press-fitting, or by injection-molding using a plastic injection-molding process. Second ball bearing 234, for example, is disposed at second bearing 134, between annular flange 292 and an annular disk 264 mounted in annular groove 247, e.g., by press-fitting or injection-molded by means of a plastic injection-molding process.

Drive spindle 120, for example, has two radial depressions 222, 224 between bearings 132, 134, which preferably are situated directly between bearings 132, 134. In addition, as described for FIG. 1, drive spindle 120 is provided with mounting device 122, on which drill chuck 145 of tool holder 140 of FIG. 1 is able to be fixed in place and which may be developed as external thread, for example. Moreover, a support flange 255 is provided on drive spindle 120, which forms an annular collar 274 and separates second bearing 134 from mounting device 122 in the axial direction of drive spindle 120. An inner ring of second ball bearing 234, for example, rests against annular collar 274.

According to one specific embodiment, spindle-locking device 250 has at least one, for example, two, spindle cylinder(s) 254, 258, which is/are disposed in radial depressions 222 and 224 respectively, with which driver studs 284 (and 288 in FIG. 3) or 282 (and 286 in FIG. 3) also engage at least partially, as described in the following text in connection with FIG. 3. Spindle cylinders 254, 258 are situated within an annular blocking element 256, which is likewise assigned to spindle-locking device 250 and developed in such a way that it prevents spindle cylinders 254, 258 from slipping out of radial depressions 224 or 222 in the radial direction of drive spindle 120.

Blocking ring 256 is joined to tool housing 105 in torsionally fixed manner, e.g., press-fit inside gear housing 110, and it is possible that corresponding play within specifiable tolerances exists both in the axial and the radial direction. As an alternative, blocking ring 256 may also be connected to gear housing 110 without play. For instance, blocking ring 256 is able to be developed in one piece with gear housing 110 or, for example, premolded thereon in the form of an insert, which is injection-molded. For example, blocking ring 256 is situated between first ball bearing 232 and annular collar 292.

Figure 3:
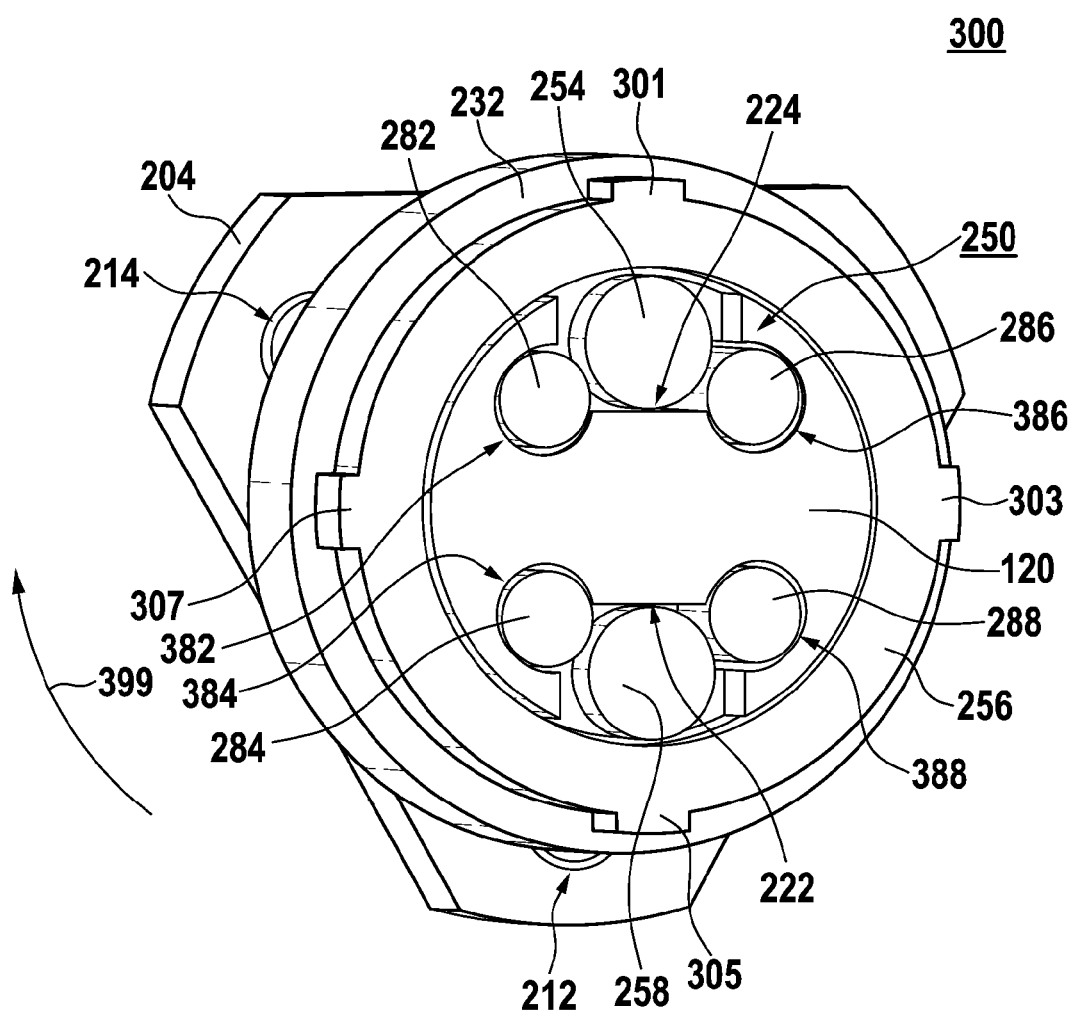
FIG. 3 shows a perspective sectional view of the drive spindle, the drive element, a roller bearing, the driver elements, the spindle cylinders, and the blocking element of FIG. 2.

FIG. 3 shows a system 300, which includes drive spindle 120 provided with radial depressions 222, 224, driving disk 204, on which hold and drive studs 212, 214 are fixed in place, ball bearing 232, driver studs 282, 284, spindle cylinders 254, 258, and blocking ring 256 of FIG. 2. Furthermore, FIG. 3, by way of example, shows radially outwardly directed projections 301, 303, 305, 307 on blocking ring 256, and also axial openings 382, 384, 386, 388, developed, for example, in the way of elongated holes in drive spindle 120, through which driver studs 282, 284 as well as further driver studs 286, 288 mounted on driving disk 204 engage with radial depressions 222, 224.

Radially outwardly directed projections 301, 303, 305, 307 of blocking ring 256 are designed to engage with associated holding grooves, which, for instance, are provided inside gear housing 110. In this way blocking ring 256 is able to be fixed in place inside gear housing 110 in torsionally fixed manner, as described in connection with FIG. 2.

According to one specific embodiment, driver studs 282, 284, 286, 288 are supported in axial openings 382, 384, 386, 388 with radial play within predefined tolerances, so that when drive spindle 120 is rotated relative to driving disk 204, driver studs 282, 288 or 284, 286 are at least partially displaceable from associated axial openings 382, 388, 384, 386 in the direction of associated radial depressions 222, 224. Spindle cylinders 258 or 254 are at least partially disposed between these driver studs 284, 288 or 282, 286 in radial depressions 222, 224, in the axial direction of driver studs 284, 288 or 282, 286.

During normal operation of handheld machine tool 100 of FIG. 1, a torque generated by drive motor 180 of FIG. 1 is transmitted to driving disk 204; from there, this torque is transmitted to drive spindle 120 via driver studs 282, 284, 286, 288, so that it may be taken along in a rotary motion or made to rotate. In so doing, spindle cylinders 254, 258 are carried along by driver studs 282, 286 or 284, 288 and therefore rotate along with driver studs 282, 284, 286, 288 and with drive spindle 120 in the interior of blocking ring 256.

If a torque is acting on drive spindle 120 when drive motor 180 of FIG. 1 is deactivated, it is arrested or centered in a predefined position by spindle-locking device 250. In the process, the acting torque turns drive spindle 120 counter to driving disk 204, so that a wedge angle is created between spindle cylinders 254, 258, blocking ring 256, radial depressions 224 and 222, and associated driver studs 282, 288 or 284, 286, which wedge angle blocks or prevents further twisting of drive spindle 120 and introduces the acting torque into gear housing 110.

In other words, due to the torque acting on it, drive spindle 120 is initially rotated relative to stationary driving disk 204, so that driver studs 282, 288 or 284, 286 are at least partially moved further into depressions 222 or 224, transversely to the axial extension of the radial depressions, i.e., in a clockwise or anti-clockwise direction in FIG. 3. For example, in a clockwise rotation of drive spindle 120 in FIG. 3 as indicated by arrow 399, driver studs 284, 286 are partially moved farther into radial depressions 222 and 224, while driver studs 288, 282 are moved further into their assigned axial openings 388 and 382, respectively. In the process, spindle cylinders 258, 254, via their contact surfaces, are pressed against torsionally fixed blocking ring 256 in radial depressions 222 and 224, and thereby block further twisting of drive spindle 120. When drive spindle 120 is rotated in a counter-clockwise direction in FIG. 3, i.e., counter to the direction of rotation marked by arrow 399, drive spindle 120 is arrested or centered in analogous manner.

Figure 4:
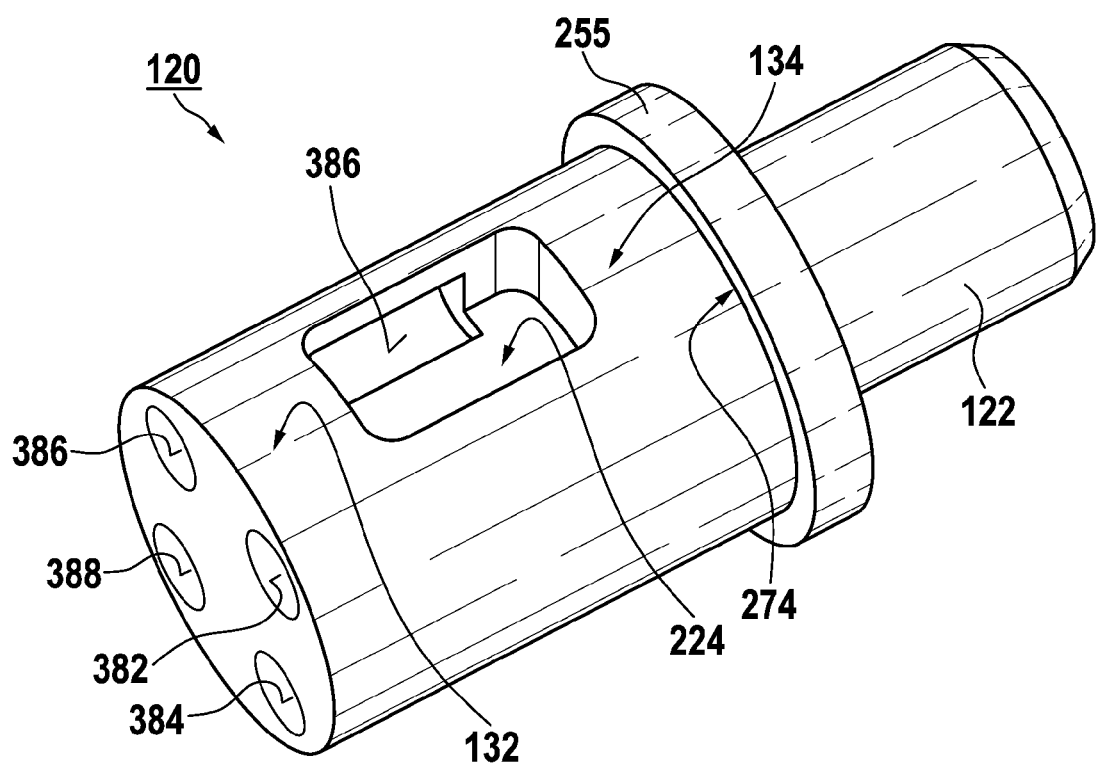
FIG. 4 shows a perspective view of the drive spindle from FIGS. 2 and 3.

FIG. 4 shows an exemplary embodiment of drive spindle 120 with axial openings 382, 384, 386, 388 and radial depression 224. FIG. 4 illustrates the axial extension of axial opening 386 up to and into radial depression 224.

FIG. 5 shows a perspective representation 500 of system 300 of FIG. 3. FIG. 5 illustrates driver studs 284, 288 and 282, 286, engaging with radial depressions 222, 224 via axial openings 382, 384, 386, 388, between which spindle cylinders 258 and 254 are supported. Furthermore, FIG. 5 shows an additional hold and drive stud 516, which is mounted on driving disk 204 just like hold and drive studs 212, 214 of FIG. 2.

What is claimed is:
1. A handheld machine tool, comprising:
a drive motor;
a drive spindle;
a gear unit transmitting a torque generated by the drive motor to the drive spindle;
a tool housing, wherein at least the gear unit is situated in the tool housing; and
a spindle-locking device assigned to the drive spindle;
wherein an entirety of a first section of the drive spindle is radially depressed compared to an entirety of a second section of the drive spindle, the second section being positioned downstream to the first section, thereby forming at least one radial depression in which at least one spindle cylinder is disposed, and wherein the at least one spindle cylinder is assigned to the spindle-locking device,
wherein the drive spindle is rotationally mounted inside the tool housing at two bearings, and a blocking ring of the spindle-locking device is situated directly between, and adjacent to both of, the two bearings in the axial direction of the drive spindle, and the at least one radial depression is situated radially inside the blocking ring,
wherein the two bearings are provided in a region adjacent to the second section of the drive spindle.

2. The handheld machine tool as recited in claim 1, wherein the two bearings inside the tool housing are provided in a region forward of the gear unit.

3. The handheld machine tool as recited in claim 1, wherein at least two driver elements for transmitting the torque generated by the drive motor to the drive spindle are situated in the drive spindle.

4. The handheld machine tool as recited in claim 3, wherein the at least two driver elements engage at least partially with the at least one radial depression.

5. The handheld machine tool as recited in claim 4, wherein the drive spindle has at least two axial openings through which the at least two driver elements engage with the at least one radial depression.

6. The handheld machine tool as recited in claim 4, wherein the at least one spindle cylinder in the at least one radial depression is at least partially disposed between the at least two driver elements in the axial direction of the at least two driver elements.

7. The handheld machine tool machine tool as recited in claim 6, wherein the at least two driver elements are configured to carry along the at least one spindle cylinder in a rotary motion when the torque generated by the drive motor is transmitted to the drive spindle, and to block the drive spindle when a torque is transmitted from the drive spindle to the at least one spindle cylinder.

8. The handheld machine tool as recited in claim 1, wherein the at least one spindle cylinder is radially supported within the blocking ring which is configured to prevent the at least one spindle cylinder from slipping out of the at least one radial depression in the radial direction of the drive spindle.

9. An electric tool as recited in claim 8, wherein the blocking ring is connected to the tool housing in a torsionally fixed manner.

* * * * *